3,206,531
METHOD OF MAKING A CLOSE TOLERANCE
CONCRETE PIPE SECTION
George R. Jessen, 708 South 13th East, Salt Lake City,
Utah, and Carl W. Chanlund, 412 Maple St., Nampa,
Idaho
Filed June 6, 1960, Ser. No. 88,239
4 Claims. (Cl. 264—296)

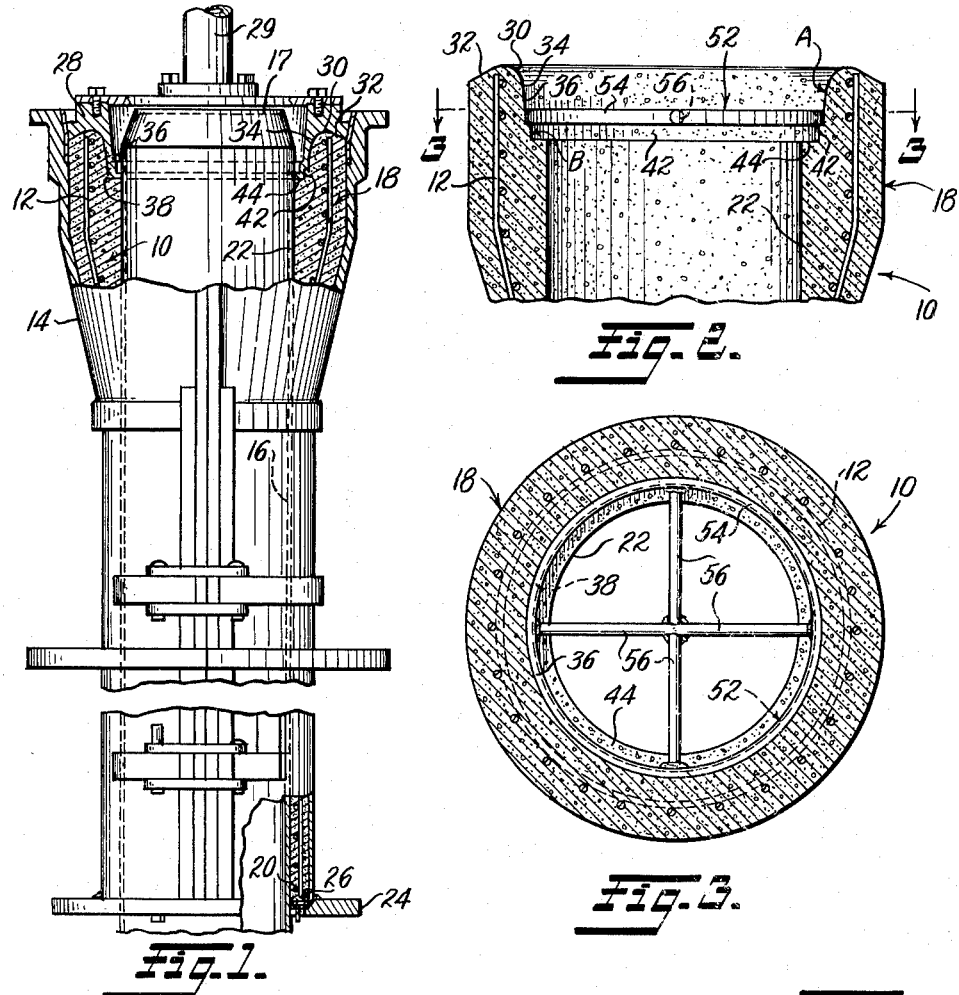
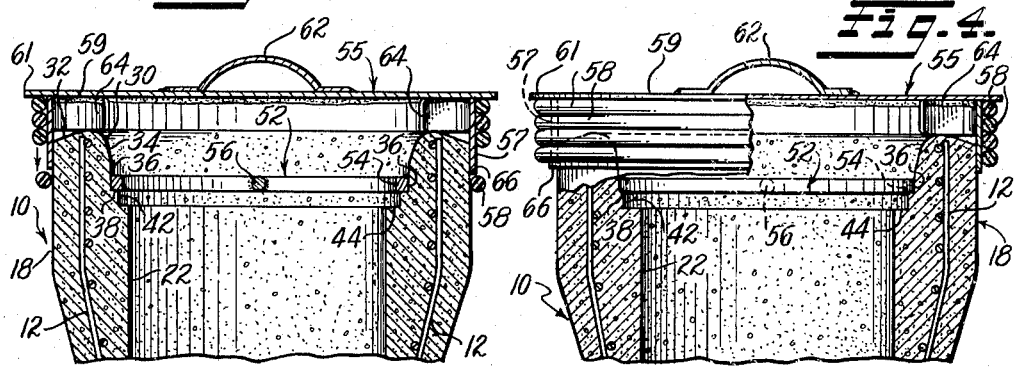
INVENTORS
George R. Jessen & Carl W. Chanlund
BY
Bacon & Thomas
ATTORNEYS Sept. 14, 1965         G. R. JESSEN ETAL         3,206,531
METHOD OF MAKING A CLOSE TOLERANCE CONCRETE PIPE SECTION
Filed June 6, 1960                              2 Sheets-Sheet 2
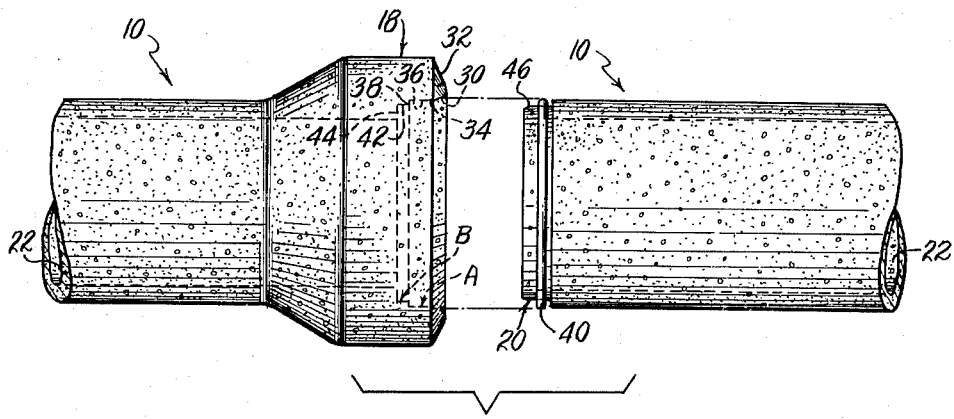
Fig. 6.
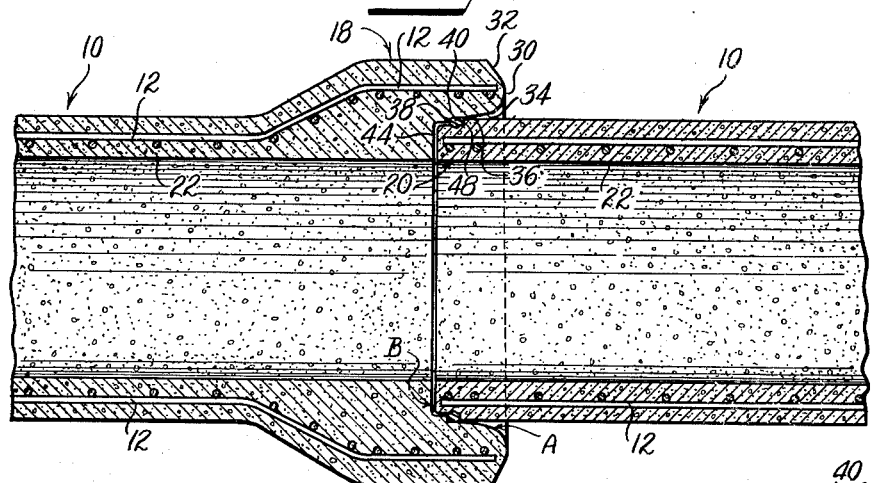
Fig. 7.
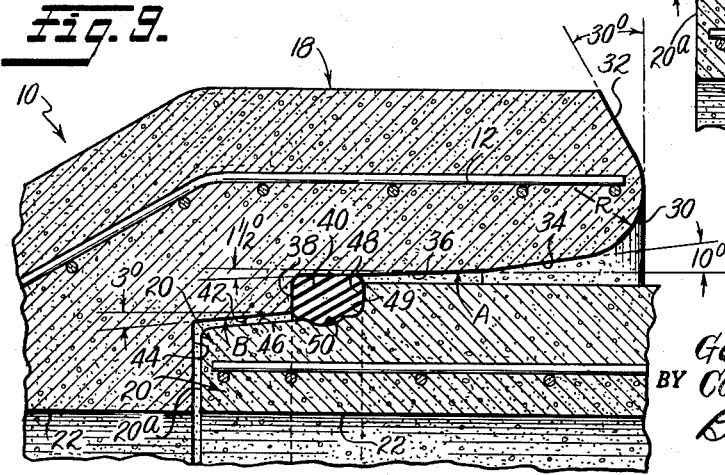
Fig. 9.
Fig. 8.
INVENTORS
George R. Jesse &
BY Carl W. Chanlund
Bacon & Thomas
ATTORNEYS United States Patent Office 3,206,531
Patented Sept. 14, 1965

The present invention relates to a method for making a concrete pipe section having novel bell and spigot ends adapted to cooperate with the ends of similar pipe sections to provide a close tolerance joint.

Prior methods of producing concrete pipe were not directed to, nor intended to, provide pipe sections having ends that interfitted with close tolerance, since such pipe was used in low pressure flow lines wherein conventional methods of packing the joints with grout or other material provided sufficient fluid tightness. However, with the development of high strength, reinforced concrete pipe capable of withstanding very high internal pressures, prior methods of sealing the joint were found inadequate to form a seal for the high pressure that the pipe could safely withstand. Therefore, it has been impossible with conventional joints to utilize the high strength of the concrete pipe to its fullest advantage.

According to the present invention, the high strength pipe sections are formed with specially shaped, close-tolerance bell and spigot ends, rendering it possible to employ a simple form of rubber gasket or sealing ring in the joint which is capable of withstanding high pressures without leaking. The present construction also greatly speeds up and simplifies joining of the pipe sections together in laying a pipe line.

More specifically, the invention relates to a method for making a pipe section having a bell and spigot type of molded joint in which the dimensions of the essential cooperating parts of the joint are held to a very close tolerance.

The present method comprises molding the pipe section and using a template of predetermined outside diameter for controlling the internal dimension of a gasket-engaging portion in the bell end of the molded pipe, said template being positionable in the pipe while still green and remaining therein during curing. The template is used in conjunction with a rubber or other elastic band that is positioned upon the exterior of the pipe in the same plane as the template to continuously apply a contractile force acting in said plane to hold the pipe engaged with the outer periphery of the template throughout the curing operation so that it will cure to the exact size determined by the template.

The invention further relates to a method of making a joint for molded bell and spigot-ended pipe in which the telescoping surfaces comprising the joint are formed with tapered and/or shouldered surfaces of uniformly controlled dimensions, thus enabling one pipe section to be interchangeably joined with any other identical pipe section.

The invention still further relates to a method of controlling the dimensions of the bell and spigot ends of concrete pipe during curing, so that the cured pipe will have dimensions that are within closer limits of tolerance than was attainable heretofore.

The present method further comprises the use of an elastic O-ring or band of predetermined diameter that is adapted to be stretched and positioned exteriorly on the bell end of a green pipe in the plane in which a predetermined interior dimension is to be maintained, and the use of a holder for said band which extends over the bell end of the pipe to approximately said plane so that the elastic band is automatically deposited in the desired position on the pipe to apply a contractile force thereto upon being rolled off the holder.

The principal object of the invention is to provide a molded, high strength concrete pipe section having bell and spigot ends cooperable with like pipe sections to provide a joint that will be effectively sealed by a simple form of gasket premounted in a shallow groove on the spigot end of one pipe section and which gasket can be readily compressed by the bell end of another pipe section during the assembly of the pipe section without damage to the gasket and without causing the ring to be displaced from the groove.

Another object is to provide a molded concrete pipe section having spigot and bell ends provided with gasket-engaging surfaces of predetermined close tolerance, and other surfaces of close tolerance contoured to guide and facilitate the joining of like pipe sections.

Another object is to provide concrete pipe sections having a joint structure that will withstand very high pressures, but which is, nevertheless, designed so that the sections can be assembled by unskilled labor. Another object is to provide a joint for high strength concrete pipe that utilizes a simple O-ring as a gasket, and wherein the gasket is compressed to form a fluid-type seal and as an incident to connecting the pipe sections together.

Still another object is to provide a joint structure for concrete pipe sections that will form a fluid-tight seal without requiring the use of the customary grouting.

A further object is to provide a method for making molded concrete pipe sections having ends including gasket-engaging portions that are held to precise dimensions.

With the foregoing and other objects in view, the invention resides in the novel method of construction hereinafter described and set forth in the accompanying claims, and illustrated in the accompanying drawings, in which:

FIG. 1 is an elevational view, partly in cross-section, showing a concrete pipe section embodying the features of the present invention disposed in a mold for making the same;

FIG. 2 is an enlarged cross-sectional view of the bell end of the pipe section with the mold removed, but with a template mounted therein to control the dimension of the gasket-engaging portion thereof;

FIG. 3 is a sectional view taken on the line 3—3 of FIG. 2, particularly illustrating the template in plan view;

FIG. 4 is an elevational view, partly in section, taken through the bell end of the pipe and through a holder employed to facilitate the accurate positioning of an elastic band about the pipe in the plane of the template;

FIG. 5 is a full sectional view through the holder and bell end of the pipe, particularly illustrating the manner in which the band may be rolled off the holder onto the pipe section;

FIG. 6 is an elevational view of the bell end of one pipe section aligned with the spigot end of another pipe section, and with a gasket in position on the spigot end prior to joining the pipe sections together;

FIG. 7 is a longitudinal sectional view through the two pipe sections of FIG. 6, showing the joint formed by the pipe sections when in their connected position;

FIG. 8 is an enlarged fragmentary view of the spigot end of the pipe section, particularly illustrating the cross-sectional shape of the gasket or sealing ring prior to assembly of the pipe sections; and FIG. 9 is an enlarged sectional view of a portion of the joint shown in FIG. 7.

Referring to FIG. 1 of the drawings, the numeral 10 designates a concrete pipe section containing steel reinforcing elements 12. The pipe section 10 is illustrated in a metal mold comprising an outer section 14 and an inner section 16 having a closed, frusto-conical upper end 17. The mold is shaped and constructed to provide an enlarged bell end 18 and a reduced-diameter spigot end 20. The inner mold section or core 16 provides a cylindrical bore 22 of uniform diameter extending throughout substantially the entire length of the pipe section 10. The outer mold section 14 rests upon a plate 24 that carries a ring 26 for shaping the spigot end 20. The plate 24 may be rotatably mounted, if desired, to impart rotary movement to the mold sections 14, 16. The core 16 rotates with the mold section 14 during the filling of the mold. The concrete may be tamped and the mold vibrated during filling. After filling, the bell end 18 may be shaped by any suitable forming tool 28 secured to a reciprocatingly mounted shaft 29, so long as it provides the particular cross-sectional configuration shown and described in detail hereinafter. The mold parts 14, 16, 24, and 26, and the forming tool 28 may be of any suitable construction and, therefore, need not be described further. As will be readily understood, after sufficient concrete has been compacted in the mold 14, 16 to form a complete pipe section, the forming tool 28 is lowered into the mold. The tool 28 may be rotated relative to both the outer mold section 14 and the core 16, or the tool 28 may be held stationary and the mold sections 14, 16 may be rotated, to shape the bell end 12 and to give it a smooth finish. The tool 28 is then raised out of the mold and the core 16 is withdrawn through the lower end of the pipe section 10 by means not shown.

Referring particularly to FIGS. 2 and 9, the bell end 12 has an extremity defined in part by a rounded portion 30 formed on a radius R that blends outwardly into a conical surface 32 inclined on an angle of about 30° to the plane of the end of the pipe section. The rounded portion 30 merges inwardly into a frusto-conical or tapered side wall portion 34, inclined on an angle of about 10° relative to the axis of the pipe section and which, in turn, merges with an inwardly tapered side wall portion 36, disposed on an angle of about 1½° to said axis. The side wall portion 36 terminates at its inner end at a transverse shoulder 38 perpendicular to the axis of the pipe section, which forms an abutment for a sealing ring or gasket 40. The gasket 40 may be made of rubber, neoprene or any other suitable material. The bell end includes a third tapered side wall portion 42 disposed on an angle of about 3° to the axis of the pipe section. The side wall portion 42 starts at its outer end with the transverse shoulder 38 and terminates at its inner end at a similar transverse shoulder 44. The side wall portions 34 and 36 and shoulder 38 define a first inwardly tapered enlargement A at the extremity of the bell end 12 of the pipe section 10 and the side wall portion 42 and shoulder 44 define a second inwardly tapered enlargement B of smaller diameter than the outer-most enlargement. Thus, the outermost enlargement A includes the transverse shoulder 38 and the side wall portion 36 that constitute gasket-engaging surfaces. The diameter of the side wall portion 36 is held to an exact dimension adjacent the shoulder 38 by a method that will be explained later.

The cross-sectional configuration of the spigot end 20 of the pipe section 10 is best shown in FIG. 8. It will be noted therefrom that the spigot end 20 terminates in a reduced diameter end portion that is inclined outwardly on an angle of about 3° to the axis of the pipe section, so that the side wall surface 46 correspondingly tapers outwardly from the extremity of the pipe section. The reduced end portion 46 is of greater axial length than the side wall portion 42 and terminates at a shoulder 48 disposed perpendicular to the axis of the pipe section. The taper on the side wall portion 42 of the inner enlargement B of the bell end 12 of the pipe section 10 is complemental to the tapered portion 46 on the spigot end 20 of said pipe section, so that when two of the pipe sections are assembled, these surfaces are substantially parallel (see FIG. 9). The dimensions of the surfaces 42 and 46 are carefully chosen so that the maximum clearance between the reduced part 46 of the spigot end 20 and the side wall portion 42 of the inner enlargement B does not exceed about 1/16″ for pipe sizes ranging from 4″ to 18″ inside diameter. Thus, a very close tolerance is provided between the mating ends of the pipe sections. The reduced portion 46 cooperates with the side wall portion 42 to serve as a guide for aligning the pipe sections while being joined together, as will appear hereinafter.

In order to provide means for retaining the gasket 40 in position on the spigot end 20, and to also provide the desired close tolerance in the joint, a shallow groove 50 is formed adjacent the shoulder 48 to provide a seat for the gasket, as best shown in FIG. 8. The groove 50 may be formed by any suitable grooving tool before the pipe is cured and becomes hard, or it may be accurately ground to a predetermined depth and diameter by a grinding wheel after the pipe section has almost completely cured, since grinding at such time is easier than it would be after the pipe has fully hardened under complete curing. The axial surface of the groove 50 may conform to a ¼″ radius in order to serve as a seat for a gasket 40 having a cross-sectional diameter of 7/16″ or ½″. A 7/16″ gasket is preferable for 4″ to 10″ inside diameter pipe, wherein the clearance between the walls 36 and 46 is 5/16″; whereas, a ½″ gasket is preferable for 12″ to 18″ inside diameter pipe, wherein said clearance is 3/8″. The shoulder 48 serves as an abutment for the gasket 40 when compressed, as shown in FIG. 9 and will be explained more fully hereinafter. The surface 46 is adapted to be engaged by the gasket 40 and is preferably joined with the shoulder 48 by a curved portion 49 having a radius of approximately 1/16″ to provide further support for the gasket.

After the bell end 18 has been shaped, the pipe 10 is preferably placed in a steam-heated chamber to cure. A preliminary step in curing is to remove the exterior and interior molding forms 14 and 16. The pipe section 10 is formed from a fairly dry concrete mix, so that after compacting in the mold 14, 16, it will stand without "slump" upon removal of said mold while still green. While the pipe section is still green, a sizing template 52 is inserted in the outermost enlargement A of the bell end 12 of the pipe section. The template comprises a metal ring 54 of a predetermined shape and external diameter corresponding to the exact desired dimension of the portion of the bell end of the pipe section that is to be engaged by the gasket 40. The outer surface of the ring 54 may be tapered on an angle of about 1½ degrees to its axis, or it may be made cylindrical and of uniform diameter. The template ring 54 is adapted to rest upon the shoulder 38, as shown in FIG. 2. Radial spokes 56, which retain the ring in the desired true circular condition, provide a means for handling the ring in inserting it and removing it from the bell end 12 of the pipe section 10.

An elastic band 58 is placed about the outer surface of the pipe section 10 in the horizontal plane of the template 52, as shown in FIG. 5, for the purpose of maintaining a constant inwardly directed pressure on the concrete during curing. The force exerted by the band 58 is sufficient to hold the green concrete against the outer surface of the template ring 54 during the curing operation, thereby assuring that the side wall surface 36 engaged by said template ring will provide the desired close tolerance in the cured pipe section.

A special holder or tool 55, FIGS. 4 and 5, is provided for the purpose of facilitating the application of the elastic band 58 upon the bell end 18 of the uncured pipe section 10. The tool 55 comprises a cylindrical sleeve 57 sufficiently long to carry three or four of the bands 58 in a stretched state to facilitate the deposit of one band at the proper position about the bell end of a corresponding number of pipes. The sleeve 57 has an inside diameter slightly larger than the outside diameter of the bell end 18 of the pipe section 10, so that the sleeve 57 can be easily slipped over said bell end. The upper edge of the sleeve 57 is welded to a disc 59, which is larger in diameter than said sleeve and projects therebeyond to provide a projecting circular flange 61. A handle 62 is welded or otherwise secured to the disc 59 to facilitate mounting the holder 55 on, or removing said holder from, the bell end 18 of the pipe section 10. A plurality of radial ribs 64 extend inwardly from the sleeve 57 and downwardly from the disc 59. The ribs 64 are of a predetermined height to limit the extent to which the sleeve 57 can telescope with the bell end of the pipe. The ribs 64 are adapted to rest upon the upper end of the pipe 10 and their axial length is so designed as to place the lower edge 66 of the sleeve 57 in a position slightly above the plane of the template ring 54.

The diameter of the sleeve 57 is greater than the relaxed diameter of the elastic bands 58, so that said bands must be stretched in order to mount them upon said sleeve. The bands 58 are preferably circular in radial cross-section, so that they can be readily removed successively from the sleeve 57 and deposited upon the pipe by rolling the lower-most band off the sleeve. As has been indicated above, the lower edge 66 of the sleeve 57 is located relative to the template ring 54, so that the elastic band 58 that is removed from the sleeve is deposited in the horizontal plane of the template ring 54. The circular flange 61 prevents the elastic bands 58 from slipping off the upper end of the sleeve 57. Only one elastic band need be applied to each pipe section.

FIG. 6 shows two pipe sections 10, 10 in position prior to joining of the bell and spigot ends thereof. The gasket 40 is normally of smaller diameter than the reduced spigot end 20 of the pipe section and must be stretched in order to mount the same thereon. The groove 50, which receives the gasket 40, not only serves as a seat therefor, but prevents the contractive force of said gasket from causing the same to slip off the tapered end of the pipe. The outside diameter of the gasket 40, when mounted upon the reduced end 20, is less than the largest diameter of the frusto-conical wall portion 34 of the enlargement A, but is substantially greater in diameter than the tapered portion 36 of said enlargement. The radial cross-sectional dimension of the gasket 40 is also substantially greater than the radial distance between the outer wall surface 46 of the spigot end 20 and the inner wall 36 of the enlargement A. As a consequence, the gasket 40 is automatically, substantially deformed in cross-section incident to the assembly of the pipe sections.

As the pipe sections are brought together axially, the gasket 40 first engages with the frusto-conical side wall 34, and since this portion is disposed on an angle of about 10°, the gasket is substantially compressed radially and elongated axially by the time that it reaches the tapered side wall portion 36. This compression takes place without any "rolling" of the gasket 40, which is prevented by the engagement of the gasket with the shoulder 48. Continued relative axial movement of the pipe sections results in further compression of the gasket 40 due to the 1½° inward taper on the wall portion 36. As the gasket 40 is deformed, it assumes a generally rectangular cross-section and engages the shoulder 48 and is held thereby against axial displacement until the gasket engages the shoulder 38 at the inner extremity of the tapered wall portion 36. When the pipe sections are in their final assembled relation, the gasket 40 will have been distorted or compressed radially 20% to 40% of its initial radial dimension, as shown in FIG. 9. The shoulder 44 may be engaged by the face 20a of the spigot end 20 to limit maximum axial compression of the gasket 40.

As the pipe sections are brought together, the tapered spigot end surface 46, in conjunction with the tapered surface of the side wall portion 42 of enlargement B, function as guide means for bringing the pipe sections together in proper aligned relationship. In order to minimize friction, the gasket 40 and the side wall surfaces 34 and 36 of the outer enlargement A are coated with a suitable rubber lubricant. Thus, the pipe sections may be easily assembled by unskilled labor.

It will be apparent from FIG. 9 that the gasket 40, due to its resilience and compressed condition and the close tolerances maintained for the surface 36 and groove 50, will constantly press against the confining shoulders 38 and 48 and against the surfaces 36 and 46 to maintain a tight seal at all times. Any fluid pressure within the pipe that enters the space between the surfaces 42 and 46 will merely tend to axially compress the gasket and thereby increase the effectiveness of the seal. The customary grouting required in prior joints is totally unnecessary.

It will be understood that various changes may be made in the details of the method described, without departing from the principles of the invention or scope of the annexed claims.

We claim:
1. The method of making a concrete pipe section and accurately controlling the internal dimension of a given portion thereof to maintain the same within close tolerances, comprising the steps of: forming the pipe section to approximately the desired shape and size in a mold; removing the mold from the pipe section prior to curing; positioning a member of a desired peripheral shape and predetermined size in the pipe section in the plane of that portion of the pipe section the internal dimension of which is to be closely controlled; curing said pipe section while maintaining a radially inwardly directed pressure on the exterior of the pipe section about its entire circumference in the plane of said member to engage the uncured concrete with the outer periphery of said member; and after curing, discontinuing said radially inwardly directed pressure, and removing said member from said pipe section.

2. The method of making the bell-end of a concrete pipe section with a close-tolerance, shouldered, internal gasket-engaging surface, comprising the steps of: forming the pipe section to substantially the desired shape and size in a mold; shaping the bell end of the pipe section to provide therein a gasket-engaging surface and a shoulder adjacent said gasket-engaging surface; removing the mold while the concrete pipe section is still uncured; positioning upon said shoulder a template of a predetermined shape and peripheral size corresponding to the desired shape and size of said gasket-engaging surface; curing said pipe section while maintaining a radially inwardly directed pressure on the outer surface of the bell end of the pipe section throughout the entire circumference thereof in the plane of said template to engage the uncured concrete with the outer periphery of said template; and after curing, discontinuing the radially inwardly directed pressure, and removing said template from said pipe section.

3. The method defined in claim 2, including the step of positioning a resilient band about the bell end of the pipe section to provide the radially inwardly directed force during the curing of the pipe section.

4. The method of making a concrete pipe section having a bell end with an internal, close tolerance, shouldered, gasket-engaging surface and a spigot end having an external, close tolerance, gasket-receiving groove and a shoulder adjacent thereto, comprising the steps of: forming the pipe section to substantially the desired shape and size in a mold; shaping the bell end of the pipe section to provide a gasket-engaging surface and a gasket-engaging shoulder therein; shaping the spigot end to provide a shouldered, reduced diameter end portion substantially complemental to the shape of said bell end; removing the mold while the concrete pipe section is still uncured; positioning a template of a predetermined shape and peripheral size upon said gasket-engaging shoulder; curing said pipe section while maintaining a radially inwardly directed pressure on the outer surface of the bell end of the pipe section throughout the entire circumference thereof in the plane of the template to engage the uncured concrete with the outer periphery of said member; after curing, discontinuing the radially inwardly directed pressure and removing said template; and grinding the exterior of said reduced diameter spigot end portion adjacent its shoulder to form a seat for a gasket.

References Cited by the Examiner

UNITED STATES PATENTS

| | | |
|---|---|---|
| 753,464 | 3/04 | Beinhauer. |
| 1,357,311 | 11/20 | Buente _____ 285—345 |
| 2,365,574 | 12/44 | McWane _____ 285—345 |
| 2,526,174 | 10/50 | Ukropina _____ 25—155 |
| 2,619,964 | 12/52 | Thaete _____ 29—235 |
| 2,840,880 | 7/58 | Jessen et al. _____ 25—155 |
| 2,955,322 | 10/60 | Hite _____ 25—127 XR |
| 2,986,411 | 5/61 | Anderson _____ 18—59 XR |

FOREIGN PATENTS

| | | |
|---|---|---|
| 366,319 | 2/32 | Great Britain. |
| 474,123 | 10/37 | Great Britain. |

ALEXANDER H. BRODMERKEL, *Primary Examiner.*

HUNTER C. BOURNE, JR., ROBERT F. WHITE,
*Examiners.*